US005644104A

United States Patent [19]

Porter et al.

[11] Patent Number: 5,644,104

[45] Date of Patent: Jul. 1, 1997

[54] ASSEMBLY FOR PERMITTING THE TRANSMISSION OF AN ELECTRICAL SIGNAL BETWEEN AREAS OF DIFFERENT PRESSURE

[76] Inventors: Fred C. Porter, 31065 Stafford Dr., Birmingham, Mich. 48010; Garth J. Schultz, 2111 Lovington Ave. #106, Troy, Mich. 48083

[21] Appl. No.: 358,254

[22] Filed: Dec. 19, 1994

[51] Int. Cl.[6] .................. H02G 3/22

[52] U.S. Cl. .................. 174/65 R; 174/65 SS; 174/135; 174/151

[58] Field of Search .................. 174/135, 151, 174/65 SS, 65 R, 152 G, 153 G, 65 G; 439/936

[56] References Cited

U.S. PATENT DOCUMENTS

| | | | |
|---|---|---|---|
| 2,294,432 | 8/1942 | Weidner | 439/322 |
| 2,987,570 | 6/1961 | Bluth | 174/77 R |
| 3,059,210 | 10/1962 | Luenberger | 439/936 X |
| 3,084,210 | 4/1963 | Bluth et al. | 174/65 SS |
| 3,109,882 | 11/1963 | Maltby | 174/151 |
| 3,352,963 | 11/1967 | Homrig | 174/151 |
| 3,386,072 | 5/1968 | Chandler | 439/936 X |
| 3,520,989 | 7/1970 | Funk et al. | 174/151 |
| 4,458,108 | 7/1984 | Kashimoto et al. | 174/152 R |
| 4,599,487 | 7/1986 | Blank et al. | 174/151 |
| 4,967,577 | 11/1990 | Gartner et al. | 70/279 |

*Primary Examiner*—Hyung S. Sough
*Assistant Examiner*—Paramita Ghosh
*Attorney, Agent, or Firm*—Brooks & Kushman P.C.

[57] ABSTRACT

An assembly is disclosed for permitting the transmission of an electrical signal between areas. A housing defines first and second areas having different pressures. A sleeve threadingly engaged with the housing defines a port, and an electrically conductive button is disposed at least partially in the port. An input wire extending into the port is connected to the button at a first point, and an output wire is connected to the button at a second point and extends into the second area. A first compressible insulator is disposed between the button and the housing, and a second compressible insulator is disposed between the button and the sleeve. An insulative O-ring is disposed between the first insulator and the second insulator, and a third insulator is disposed between the sleeve and the second insulator.

23 Claims, 2 Drawing Sheets

ASSEMBLY FOR PERMITTING THE TRANSMISSION OF AN ELECTRICAL SIGNAL BETWEEN AREAS OF DIFFERENT PRESSURE

TECHNICAL FIELD

This invention relates to assemblies for permitting the transmission of an electrical signal between areas of different pressure, and more particularly to an assembly for permitting the transmission of an electrical signal from an area of atmospheric pressure into a sealed high-pressure tank.

BACKGROUND ART

A need arises in many applications for permitting the transmission of an electrical signal between areas of different pressure. In tanks which contain gas or fluid under pressure, for example, it is often necessary to conduct the signal into the tank to control a solenoid-operated valve. Because the tank must be breached in order to pass a wire through to the valve, some provision must be made for maintaining a seal against the leakage of contents out of, or contaminants into, the tank.

One method of accomplishing this seal in through the use of epoxies or other potting compounds. U.S. Pat. No. 2,987,570, for instance, discloses a fluid-tight connector structure which includes a vulcanized sleeve molded into place. U.S. Pat. No. 3,352,963 shows a different design in which a low pressure side conductor rod and a high pressure side conductor rod are joined by a connector provided with an external conical sealing surface received within an insulating sleeve. The sleeve and the connector are received within a pair of nested concentric metal sleeves each having complementary tapered sealing surfaces and seats. A hollow loading nut houses the sleeves and connector and draws them together into sealing relation when the nut is threadably secured to a wall.

SUMMARY OF THE INVENTION

The present invention is an assembly for permitting the transmission of an electrical signal between areas. The assembly comprises a housing, a sleeve, first and second electrically conductive members, and first, second and third insulators. The housing defines a first area and a second area. The sleeve cooperates with the housing to define a port. The button is disposed at least partially in the port, and the first electrically conductive member is disposed in the first area and in electrical communication with the button. The second electrically conductive member is disposed in the second area and in electrical communication with the button. The first insulator is disposed between the button and the housing. The second insulator is disposed between the button and the sleeve, and the third insulator is disposed between the first insulator and the second insulator.

Accordingly, it is an object of the present invention to provide an assembly of the type described above which permits the transmission of an electrical signal between areas of different pressure.

Another object of the present invention is to provide an assembly of the type described above which permits the transmission of an electrical signal to a solenoid operated valve located inside a tank of compressed gas.

These and other objects, features, and advantages of the present invention are readily apparent from the following detailed description of the best mode for carrying out the invention when taken in conjunction with the accompanying drawings.

BEST MODE FOR CARRYING OUT THE INVENTION

Figure 1:
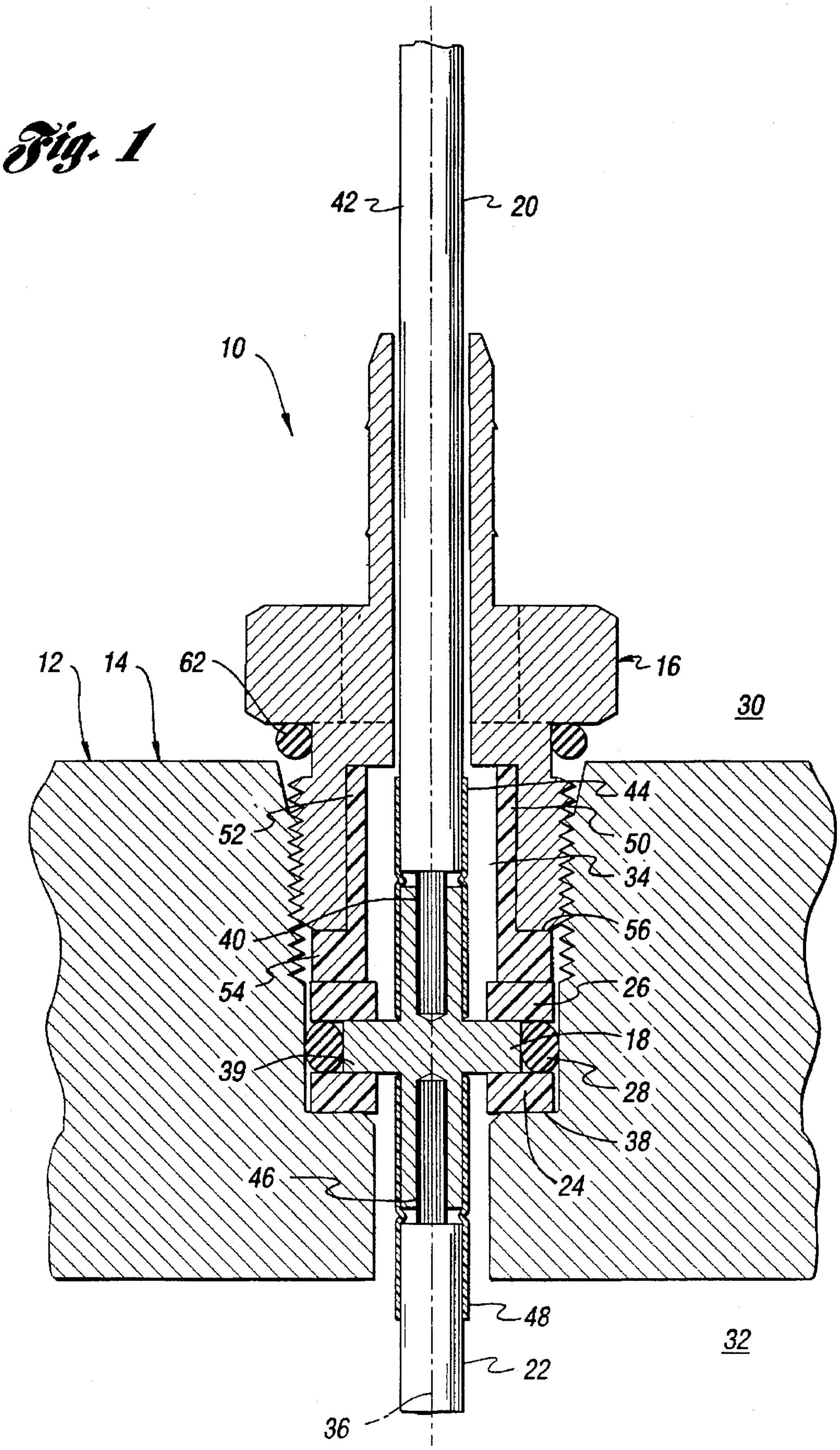
FIG. 1 is a cross-sectional view of an assembly according to the present invention, in a preliminary configuration, for permitting the transmission of an electrical signal between areas.
Figure 2:
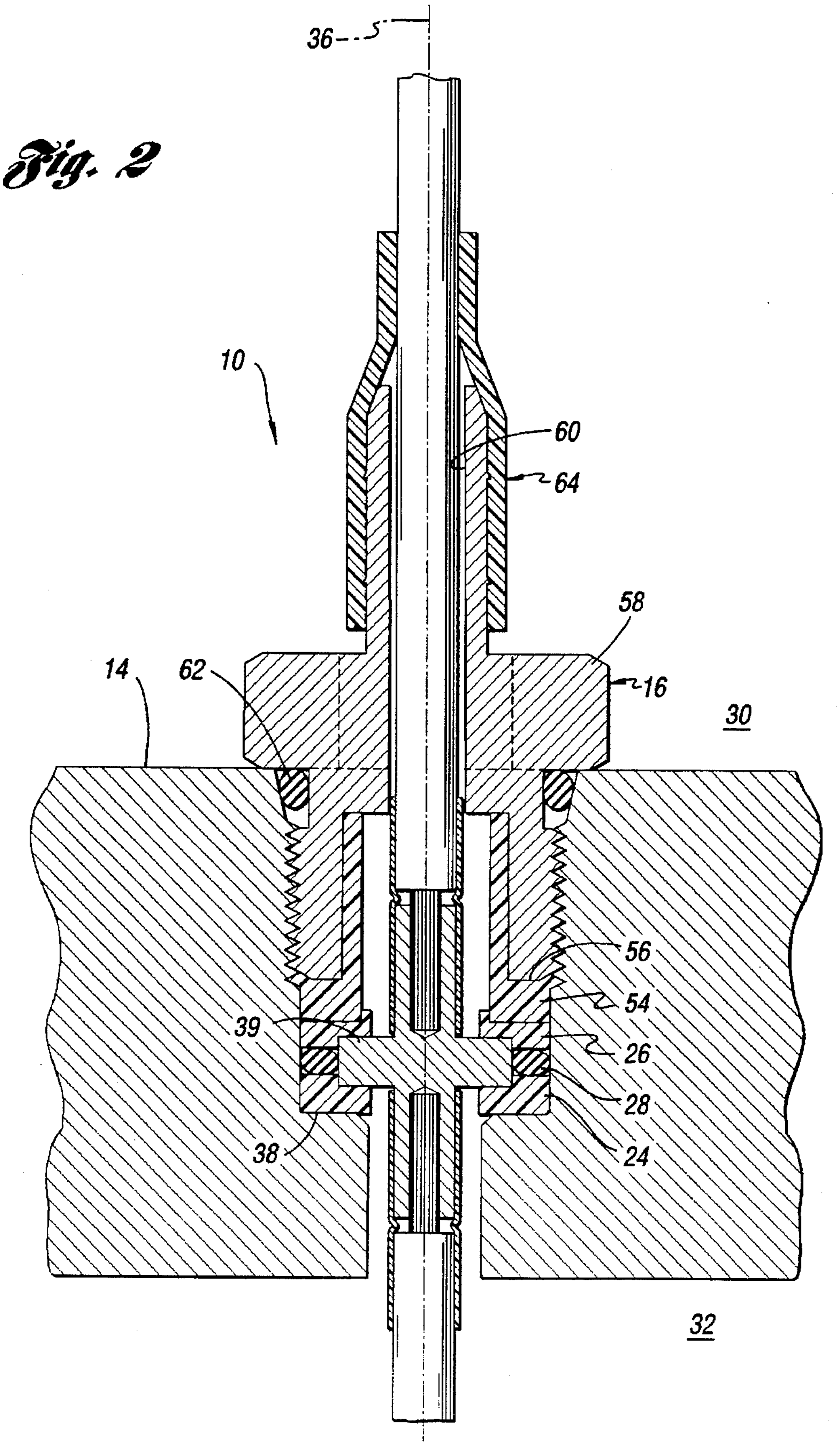
FIG. 2 is a cross-sectional view of the assembly in an operational configuration.

With reference to the drawings, the preferred embodiments of the present invention will be described. FIGS. 1 and 2 show an assembly 10 according to the present invention for permitting the transmission of an electrical or electronic signal between areas of different pressure. In a preferred embodiment, the signal is transmitted to a device such as the coil of a solenoid operated tank valve (not shown) contained in a vessel 12 which houses a pressurized fluid.

FIG. 1 shows the assembly 10 in a partially assembled configuration. The assembly 10 comprises a vessel housing 14, a loading sleeve 16, a pass-through button 18, first and second electrically conductive members 20 and 22, and insulators 24, 26 and 28.

The housing 14, typically constructed of steel, aluminum or steel wrapped with fiberglass-reinforced plastic (FRP), or plastic wrapped with FRP, defines a first area or outer side 30 and a second area or inner side 32. The outer side 30 of the vessel 12 is typically at atmospheric pressure, while the pressure on the inner side 32 is normally much greater. In a preferred embodiment where the vessel 12 contains compressed natural gas, the interior pressure may range up to 3600–5000 pounds per square inch or above.

The loading sleeve 16 is threadingly engaged with the housing 14 to define a port 34 between the areas 30 and 32. The port 34 has a longitudinal axis represented by the line 36, and a seat 38 formed at the base of the port in the housing 14 generally perpendicular to the axis 36.

The button 18 is generally cross-shaped having a flange 39 extending generally transversely to the axis 36. The button 18 is disposed at least partially in the port 34, with the flange 39 extending radially beyond the inside diameter of the seat 38. The button 18 is electrically conductive, and may be formed of a metal such as copper. The first electrically conductive member 20 preferably comprises an input wire which extends into the port 34 from a signal generating control device (not shown) on the low pressure side 30 of the vessel. The input wire 20 is connected to the button 18 at a first point 40, preferably by stripping a short length of insulation 42 off the end of the input wire and then crimping or soldering the bare end into a bore in the top of the button. An insulative tube 44 is heat shrunk generally around the first point 40.

The second electrically conductive member 22 also preferably comprises a wire, and extends into the port 34 from the solenoid tank valve or other electrical device in the high pressure area 32. The output wire 22 is connected to the button 18 at a second point 46, and another insulative tube 48 is heat shrunk generally around the second point in fashion similar to the input wire 20.

The first or lower insulator 24 is preferably in the form of a washer, and is disposed in the port 34 generally between the button 18 and the housing 14 adjacent the seat 38. The second or upper insulator 26 is also preferably in the form of a washer, and is disposed in the port 34 generally between the button 18 and the sleeve 16. The insulators 24 and 26 serve to electrically isolate the button from the housing 14 and the sleeve 16, and therefore desirably comprise nylon or another non-conductive material.

The third insulator 28 is preferably an O-ring disposed in the port 34 between the upper insulator 26 and the lower insulator 24, and between the button 18 and the housing 14. The O-ring 28 also preferably comprises an insulative material, but may be constructed from a material different than the material comprising the insulators 24 and 26, such as an artificial rubber.

A fourth insulator 50 is optionally provided between the upper insulator 26 and the sleeve 16. The fourth insulator 50 includes a hollow conical section 52 in contact with the inner side of the sleeve and generally concentric with the axis 36 of the port, and a flange section 54 disposed between a bottom surface 56 of the sleeve 16 and the top of the second insulator 26. The fourth insulator 50 provides additional electrical isolation for the innermost portion of the input wire 20. An annular gap remains between the fourth insulator 50 and the shrink tube 44.

FIG. 2 shows the assembly 10 in an operational configuration, which is accomplished by tightening the loading sleeve 16 to draw it into the port 34, preferably until a flange 58 of the sleeve abuts the outer surface of the housing 14. Upon tightening, the lower surface 56 of the sleeve 16 loads the flange section 54 of the fourth insulator 50. The fourth insulator in turn loads the insulator 26, the button flange 39, and the insulators 28 and 24 against the seat 38.

The lower insulator 24 is axially compressed by this force between the housing 14 and the lower surface of the button flange 39 to provide a first seal. The lower insulator is also deformed by this action to extend radially out into engagement with the inside surface of the port 34 and to extend axially at least partially around the flange of the button. The O-ring 28 is similarly trapped and compressed between the upper and lower insulators 26 and 24, but is contained against significant radial expansion by the smooth outer surface of the button flange 39 and the smooth inside surface of the port 34. The O-ring 28 is thereby deformed to more thoroughly fill the cavity it occupies and provide a second seal.

A third seal is formed by the axial deformation of the upper insulator 26. Like the lower insulator 24, the upper insulator 26 also expands radially against the inside of the port 34, and an outer portion is forced into the space between the button flange 39 and the inside wall of the port against the top of the O-ring 28. Any leakage past the first and second seals is thus inhibited from migrating radially inwardly toward the axis 36 of the port 34.

Further leakage through the threads of the assembly 10 is inhibited by the fourth insulator 50 and a sealing member 62 disposed between the housing 14 and the flange 58 of the sleeve 16. Upon loading of the sleeve 16, the flange section 54 of the fourth insulator 50 deforms radially against the inside wall of the housing 14, and preferably into any unoccupied lower female threads. At the same time the sealing member 62, preferably an O-ring, deforms to inhibit a leak from escaping from the port 34 toward the metal to metal contact of the sleeve flange and housing.

A short length of heavy duty heat shrink tubing 64 may be installed after the sleeve 16 is tightened to prevent water or other contaminants from entering the port 34. The tubing 64 also serves as a means of strain relief of the input wire 20.

The number of pass-through assemblies 10 needed for any particular application is dictated by the number of internal devices requiring signals and the configuration of the electrical circuity. A given application may require only two signals, i.e "power" and "ground" in the case of an internal device configured as a solenoid coil. In such a configuration, two pass-through ports would be required. The number of pass-through ports that can be provided in a vessel is limited only by space considerations of the vessel.

It should be understood that while the forms of the invention herein shown and described constitute preferred embodiments of the invention, they are not intended to illustrate all possible forms thereof. It should also be understood that the words used are words of description rather than limitation, and various changes may be made without departing from the spirit and scope of the invention disclosed.

What is claimed is:

1. An assembly for passing an electrical signal between areas, comprising:

a housing defining a first area and a second area;

a sleeve cooperating with the housing to define a port;

a button disposed at least partially in the port;

a first electrically conductive member disposed in the first area and being in electrical communication with the button;

a second electrically conductive member disposed in the second area and being in electrical communication with the button;

a first insulator disposed between the button and the housing;

a second insulator disposed between the button and the sleeve;

a third insulator disposed between the first insulator and the second insulator; and a fourth insulator disposed between the sleeve and the second insulator.

2. The assembly of claim 1 wherein the first electrically conductive member is connected to the button at a first point, and the assembly further comprises a first insulative tube disposed generally around the first point.

3. The assembly of claim 2 wherein the second electrically conductive member is connected to the button at a second point, and the assembly further comprises a second insulative tube disposed generally around the second point.

4. The assembly of claim 3 wherein the first electrically conductive member extends from the first area into the sleeve at a third point, and the assembly further comprises a third insulative tube disposed generally around the third point.

5. The assembly of claim 1 wherein the third insulator comprises an O-ring.

6. The assembly of claim 1 wherein the sleeve is adapted to threadingly engage the housing.

7. The assembly of claim 1 wherein the sleeve comprises a flange adapted to cooperate with the housing, and the assembly further comprises a sealing member disposed between the housing and the flange of the sleeve.

8. The assembly of claim 7 wherein the sealing member comprises an O-ring.

9. The assembly of claim 1 wherein the first electrically conductive member comprises a wire.

10. The assembly of claim 1 wherein the second electrically conductive member comprises a wire.

11. The assembly of claim 1 wherein the first insulator is compressible.

12. The assembly of claim 1 wherein the first insulator comprises nylon.

13. The assembly of claim 1 wherein the port has a longitudinal axis, and the button comprises a flange disposed generally transversely to the longitudinal axis.

14. An assembly for permitting the transmission of an electrical signal between areas, comprising:

a housing defining a first area having a first pressure and a second area having a second pressure normally greater than the first pressure;

a sleeve threadingly engaged with the housing to define a port having an axis;

an electrically conductive button disposed at least partially in the port;

a first wire extending from the first area into the port and connected to the button at a first point;

a second wire extending from the second area into the port and connected to the button at a second point;

a first insulator disposed between the button and the housing;

a second insulator disposed between the button and the sleeve;

an insulative O-ring disposed between the first insulator and the second insulator; and a third insulator disposed between the sleeve and the second insulator.

15. The assembly of claim 14 further comprising:

a first insulative tube disposed generally around the first point; and a second insulative tube disposed generally around the second point.

16. The assembly of claim 14 wherein the first wire extends from the first area into the sleeve at a third point, and the assembly further comprises a third insulative tube disposed generally around the third point.

17. The assembly of claim 14 wherein the sleeve comprises a flange adapted to cooperate with the housing, and the assembly further comprises an O-ring disposed between the housing and the sleeve and adjacent the flange.

18. A method of passing an electrical signal between areas, comprising:

providing a housing defining a first area and a second area;

providing a sleeve which cooperates with the housing to define a port;

providing a button at least partially in the port;

providing a first electrically conductive member in the first area and in electrical communication with the button;

providing a second electrically conductive member in the second area and in electrical communication with the button;

providing a first insulator between the button and the housing;

providing a second insulator between the button and the sleeve; and providing a third insulator between the first insulator and the second insulator; and providing a fourth insulator between the sleeve and the second insulator.

19. The method of claim 18 wherein the first and second insulators are compressible, and the method further comprises drawing the sleeve toward the housing to compress the first and second insulators.

20. An assembly for passing an electrical signal between areas, comprising:

a housing defining a first area and a second area;

a sleeve cooperating with the housing to define a port;

a button disposed at least partially in the port;

a first electrically conductive member disposed in the first area and being in electrical communication with the button;

a second electrically conductive member disposed in the second area and being in electrical communication with the button;

a first insulator disposed between the button and the housing;

a second insulator disposed between the button and the sleeve; and a third insulator disposed between the first insulator and the second insulator;

the first electrically conductive member being connected to the button at a first point, and the assembly further comprising a first insulative tube disposed generally around the first point.

21. An assembly for passing an electrical signal between areas, comprising:

a housing defining a first area and a second area;

a sleeve cooperating with the housing to define a port;

a button disposed at least partially in the port;

a first electrically conductive member disposed in the first area and being in electrical communication with the button;

a second electrically conductive member disposed in the second area and being in electrical communication with the button;

a first insulator disposed between the button and the housing;

a second insulator disposed between the button and the sleeve; and a third insulator disposed between the first insulator and the second insulator;

the second electrically conductive member being connected to the button at a second point, and the assembly further comprising a second insulative tube disposed generally around the second point.

22. An assembly for passing an electrical signal between areas, comprising:

a housing defining a first area and a second area;

a sleeve cooperating with the housing to define a port;

a button disposed at least partially in the port;

a first electrically conductive member disposed in the first area and being in electrical communication with the button;

a second electrically conductive member disposed in the second area and being in electrical communication with the button;

a first insulator disposed between the button and the housing;

a second insulator disposed between the button and the sleeve; and a third insulator disposed between the first insulator and the second insulator;

the first electrically conductive member extending from the first area into the sleeve at a third point, and the assembly further comprising a third insulative tube disposed generally around the third point.

23. An assembly for passing an electrical signal between areas, comprising:

a housing defining a first area and a second area;

a sleeve cooperating with the housing to define a port;

a button disposed at least partially in the port;

a first electrically conductive member disposed in the first area and being in electrical communication with the button;

a second electrically conductive member disposed in the second area and being in electrical communication with the button;

a first insulator disposed between the button and the housing;

a second insulator disposed between the button and the sleeve; and a third insulator disposed between the first insulator and the second insulator;

the sleeve comprising a flange adapted to cooperate with the housing, and the assembly further comprising a sealing member disposed between the housing and the flange of the sleeve.

* * * * *